United States Patent
Walker et al.

(10) Patent No.: US 11,433,984 B2
(45) Date of Patent: Sep. 6, 2022

(54) BALLONET MEASUREMENT SYSTEMS AND METHODS

(71) Applicant: Lockheed Martin Corporation, Bethesda, MD (US)

(72) Inventors: James Dakota Walker, Lancaster, CA (US); Louise Kathryn Moores, Long Beach, CA (US); Clinton Jullens, Long Beach, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 591 days.

(21) Appl. No.: 16/389,099

(22) Filed: Apr. 19, 2019

(65) Prior Publication Data

US 2020/0331581 A1    Oct. 22, 2020

(51) Int. Cl.
  *B64B 1/62* (2006.01)
  *B64B 1/60* (2006.01)

(52) U.S. Cl.
  CPC . *B64B 1/60* (2013.01); *B64B 1/62* (2013.01)

(58) Field of Classification Search
  CPC .................................. B64B 1/60; B64B 1/62
  See application file for complete search history.

(56) References Cited

U.S. PATENT DOCUMENTS

| | | | |
|---|---|---|---|
| 4,482,110 A | 11/1984 | Crimmins, Jr. | |
| 4,696,444 A | 9/1987 | Regipa | |
| 5,645,248 A | 7/1997 | Campbell | |
| 6,354,535 B1 | 3/2002 | Perry et al. | |
| 7,374,321 B2 | 5/2008 | Lick et al. | |
| 8,167,240 B2 | 5/2012 | Greiner | |
| 9,611,024 B2 | 4/2017 | Greiner et al. | |

(Continued)

FOREIGN PATENT DOCUMENTS

| | | |
|---|---|---|
| CN | 108 263 591 A | 7/2018 |
| CN | 108 473 190 A | 8/2018 |
| DE | 10 2012 009313 A1 | 2/2013 |

OTHER PUBLICATIONS

Shih-Hong Chio, et al. "LiDAR Data Processing and Applications," 17, *Remote Sensing Handbook*, Three Volume Set, (pp. 343-369), 2015.

(Continued)

*Primary Examiner* — Tye William Abell
(74) *Attorney, Agent, or Firm* — Baker Botts L.L.P.

(57) ABSTRACT

An airship includes a ballonet, a ballonet tracking system, and a vehicle management system. The ballonet is disposed within the airship and includes a ballonet surface. The ballonet tracking system includes one or more light emitters disposed within the ballonet at one or more fixed locations and one or more light detectors disposed within the ballonet at the one or more fixed locations. The ballonet tracking system measures a plurality of distances between one or more fixed locations and one or more locations on the ballonet surface. The ballonet tracking system also calculates differences between a predetermined set of expected distances and the plurality of measured distances. Based on the calculated differences, the ballonet tracking system calculates a volume of the ballonet. The vehicle management system is communicatively coupled to the ballonet tracking system and controls the operation of the airship using the calculated volume of the ballonet.

19 Claims, 5 Drawing Sheets

(56) References Cited

U.S. PATENT DOCUMENTS

| 2008/0011900 | A1 | | 1/2008 | Quintana | |
|---|---|---|---|---|---|
| 2011/0101692 | A1 | | 5/2011 | Bilaniuk | |
| 2013/0035894 | A1 | * | 2/2013 | Greiner | G01F 17/00 |
| | | | | | 702/150 |
| 2017/0178971 | A1 | * | 6/2017 | Merckling | H01L 27/0922 |

OTHER PUBLICATIONS

PCT Written Opinion of the Intl. Searching Authority (PCT Rule 43bis. 1) Intl. Appln. PCT/US2020/028048 (17 pages) dated Jul. 31, 2020.

PCT Intl. Search Report (PCT Article 18 and Rules 43 and 44) Intl. Appln. PCT/US2020/028048 (5 pages), dated Jul. 31, 2020.

PCT Notification of Transmittal of the Intl. Search Repor (PCT Rule 44.1) Intl. Appln. PCT/US2020/028048 (1 page), dated Jul. 31, 2020.

* cited by examiner

BALLONET MEASUREMENT SYSTEMS AND METHODS

TECHNICAL FIELD

This disclosure relates in general to ballonets, and more particularly to monitoring the volume of ballonet.

BACKGROUND

A ballonet is an air bag disposed within the outer envelope of an airship. When the ballonet is inflated, the ballonet reduces the volume within the airship available for lifting gas. Air is characteristically denser than lifting gas, therefore, the density of the airship changes as the ballonet changes volume. For example, inflating the ballonet may increase the overall mass of the airship, while deflating it will reduce the mass.

Ballonets may typically be used in non-rigid or semi-rigid airships, commonly with multiple ballonets located both fore and aft to maintain balance and to control the pitch of the airship. Accordingly, proper management of the ballonet is necessary to control the movement of the airship.

Typically, ballonet volume has been managed manually, either by feel or by using a bubble window with markings on the inside of the ballonet. For example, the pilot may stick his head into the bubble window and visually inspect the markings. Based on these markings, the pilot can determine a relative volume of the ballonet.

SUMMARY OF THE DISCLOSURE

According to one embodiment, an airship includes a ballonet, a ballonet tracking system, and a vehicle management system communicatively coupled to the ballonet tracking system. The ballonet is disposed within the airship and the ballonet includes a ballonet surface. The ballonet tracking system includes one or more light emitters disposed within the ballonet at one or more fixed locations and one or more light detectors disposed within the ballonet at the one or more fixed locations.

The ballonet tracking system measures a plurality of distances between one or more fixed locations and one or more locations on the ballonet surface. The ballonet tracking system calculates differences between a predetermined set of expected distances and the plurality of measured distances. And, based on the calculated differences, the ballonet tracking system calculates a volume of the ballonet. The vehicle management system controls the operation of the airship using the calculated volume of the ballonet.

According to another embodiment, a system includes one or more light emitters and one or more light detectors. The one or more light emitters and the one or more light detectors are disposed within a ballonet of an airship at one or more respective fixed locations. The system measures a plurality of distances between one or more fixed locations and one or more locations on a surface of the ballonet. The system further calculates differences between a predetermined set of expected distances and the plurality of measured distances. The system further, based on the calculated differences, calculates a volume of the ballonet. The airship is operated at least based on the calculated volume of the ballonet.

According to yet another embodiment, a method for controlling the operation of an airship is provided. The method includes measuring a plurality of distances between one or more fixed locations and one or more locations on a surface of a ballonet disposed in an airship. The method further includes calculating differences between a predetermined set of expected distances and the plurality of measured distances. The method further includes, based on the calculated differences, calculating a volume of the ballonet. The method further includes controlling the operation of the airship using the calculated volume of the ballonet.

Each of the embodiments summarized above may have one or more variation or optional feature that may provide one or more additional or different advantages. Non-limiting examples of such variations and/or optional features are disclosed herein, but further variations and/or features may be suitably understood based on the disclosure, including the detailed description, claims, and accompanying drawings.

The present disclosure may provide numerous technical advantages. For example, certain embodiments provide highly accurate volume measurements for a ballonet in an airship by measuring the relative differences in distance from one or more fixed locations and predetermined distances. Such measurements may be made for even large ballonets, which when not full, may have complicated and highly irregular surfaces. As another example, one or more lasers and one or more light detectors may be used to measure the respective distances to the surface of the ballonet. A variety of configurations of the lasers and light detectors may be used based on the geometry and size of the ballonet. As yet another example, the calculated volume may be used to determine the center of mass and overall mass of air within the ballonet. This information may be used by a vehicle management system to adjust the air within the ballonet to control the movement of the airship.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

Measuring the volume of a ballonet is increasingly difficult as ballonets increase in size and the more variability between the volume during normal operation. For example, for larger ballonets, the relative volume is difficult to discern by only viewing a small portion of the ballonet surface, e.g., by visually inspecting markings on the ballonet. This is, at least in part, due to the fact that the ballonet surface may fold on itself or collapse in localized positions on the ballonet surface when insufficient air is disposed within the ballonet for it to maintain a continuous surface. As a result, visually inspecting a smooth region of the ballonet may not indicate that the ballonet currently has smaller volume. Similarly, the more that the ballonet decreases in volume, the more the ballonet is susceptible to folding onto itself. Thus, in such cases, it is desired to have systems and methods of accurately measuring the volume of the ballonet.

The present disclosure may provide numerous technical advantages. For example, certain embodiments provide highly accurate volume measurements for a ballonet in an airship by measuring the relative differences in distance from one or more fixed locations and predetermined distances. Such measurements may be made for even large ballonets, which when not full, may have complicated and highly irregular surfaces. As another example, one or more lasers and one or more light detectors may be used to measure the respective distances to the surface of the ballonet. A variety of configurations of the lasers and light detectors may be used based on the geometry and size of the ballonet. As yet another example, the calculated volume may be used to determine the center of mass and overall mass of air within the ballonet. This information may be used by a vehicle management system to adjust the air within the ballonet to control the movement of the airship.

Other technical advantages will be readily apparent to one skilled in the art from the following figures, descriptions, and claims. Moreover, while specific advantages have been enumerated above, various embodiments may include all, some, or none of the enumerated advantages.

Figure 1:
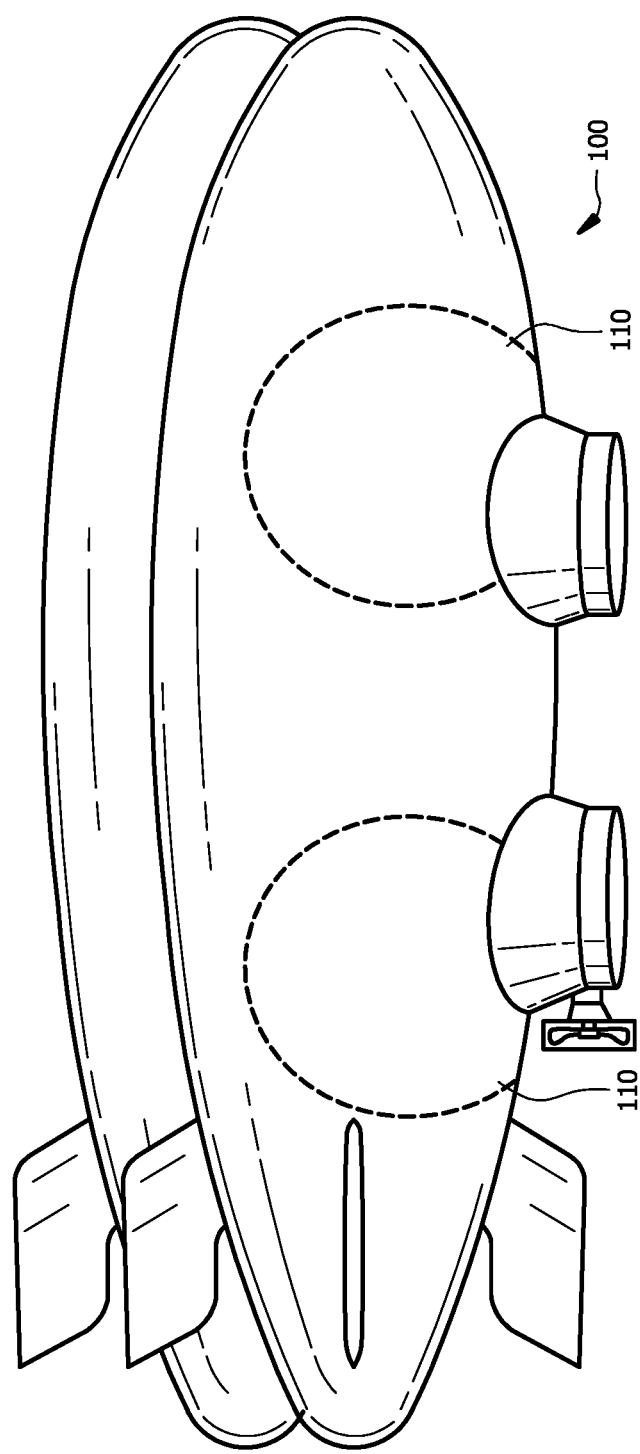
FIG. 1 illustrates an example airship having at least two ballonets, according to certain embodiments.

FIG. 1 illustrates an example airship 100 having at least two ballonets 110, according to certain embodiments. Airship 100 may be any type of airship or lighter-than-air aircraft that can navigate through the air under its own power. Airship 100 may use a lifting gas that is less dense than the surrounding air to provide lift to airship 100 to overcome gravity. Airship 100 may be a non-rigid, semi-rigid, or rigid airship.

In certain embodiments, airship 100 includes at least two ballonets 110. Ballonets 110 are configured to be filled with air, e.g., surrounding air having the same density as the air outside of airship 100. An operator of airship 100 may control the flow in and out of each of ballonets 110. Ballonets 110 may be inflated, thereby reducing the volume within airship 100 available for lifting gas. Air is typically denser than lifting gas, therefore, the density of airship 100 changes as the ballonet changes volume. For example, inflating ballonets 110 may reduce the overall lift, while deflating ballonets 110 may increase lift.

Ballonets 110 are typically used in non-rigid or semi-rigid airships, commonly with multiple ballonets 110 located both fore and aft of the respective airship, e.g., airship 100, to maintain balance and to control the pitch of the airship. In certain embodiments, the pitch of airship 100 is controlled by controlling the relative inflation of ballonets 110. For example, one of ballonets 110 near the rear of airship 100 may be inflated more than one of the ballonets 110 near the front of airship 100. This may induce airship 100 to pitch up because the front of airship 110 is less dense than the rear of airship 100, e.g., due to a higher volume of lifting gas at the front of airship 110.

Additionally, ballonets serve an important purpose in maintaining hull pressure within an operable range. For example, because air pressure reduces as airship 100 increases in altitude, a soft hull of airship 100 would experience greater internal pressure when rising. This internal pressure may exert unnecessary stress on the hull and if the difference between a minimum and a maximum altitude was great enough, as it could be in limited circumstances, the hull may be structurally compromised. This may have negative impacts throughout airship 100 because the hull is used as a mounting structure for other parts of airship 100. Accordingly, maintaining the correct pressure within ballonets 110 is important in maintaining the pressure on exerted on the hull within the optimal ranges.

As discussed earlier, conventional techniques for measuring the volume of the ballonet are prone to inaccuracies and human error. Disclosed herein are embodiments of methods and systems that provide an accurate measurement of the volume of a ballonet, such as ballonet 110, which may be used to control the operation of an airship, e.g., airship 100.

Figure 2A:
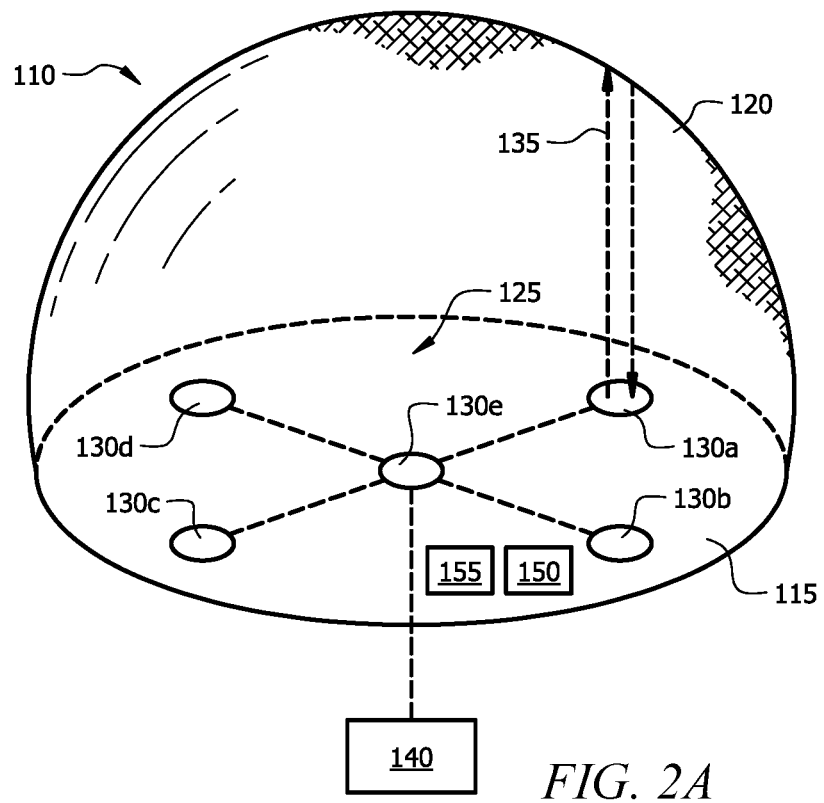
FIGS. 2A and 2B illustrate a ballonet tracking system disposed within a ballonet where the ballonet is in a full state and a partially full state, respectively, according to certain embodiments.
Figure 2B:
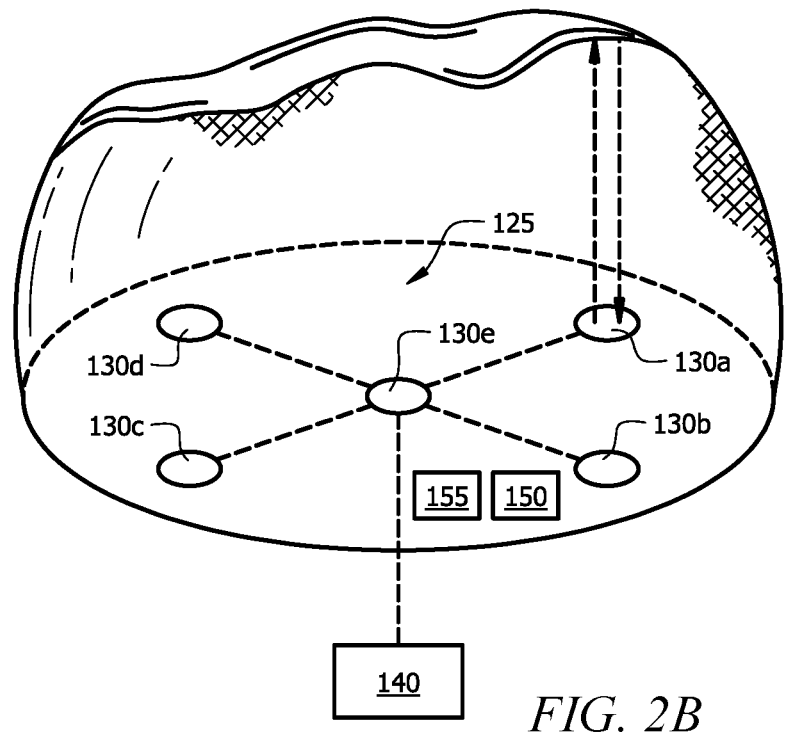

FIGS. 2A and 2B illustrate a ballonet tracking system 125 disposed within ballonet 110 where ballonet 110 is in a full state and a partially full state, respectively, according to certain embodiments. ballonet tracking system 125 may include one or more measurement devices 130a-e located within ballonet 110. For example, the illustrated example includes five measurement devices 130a-e disposed at five locations on ballonet 110.

Ballonet 110 may include a ballonet surface 120. Ballonet surface 120 is an outer surface of ballonet 110 that is impermeable or semi-permeable, such that air does not escape from ballonet 110 without intervention. In certain embodiments, measurement devices 130a-e are disposed on a portion of ballonet surface 120 of ballonet 110 that does not change shape and/or relative position to airship 100 with a change of volume of ballonet 110. In this manner, measurement devices 130a-e may maintain fixed locations, and in some embodiments a fixed orientation, within ballonet 110.

In certain embodiments, ballonet tracking system 125 is configured to measure a plurality of distances between one or more fixed locations and one or more locations on ballonet surface 120 of ballonet 110. For example, each of measurement devices 130a-e may be configured to emit light in a certain direction and receive the reflected light from the surface of ballonet surface 120. Based on the reflected light, ballonet tracking system 125 may determine the distance the light traveled from the respective measurement device 130 to ballonet surface 120 (or vice versa).

In certain embodiments, measurement devices 130a-e are at a plurality of fixed locations and each oriented in a fixed orientation relative to ballonet 110. For example, measurement devices 130a-e may be spread along the portion of ballonet 110 that does not change shape and oriented towards a respective location of ballonet 110 at a portion that deforms or changes position when the volume within ballonet 110 changes. In this example, measurement devices 130a-e may measure five distances from the locations of measurement devices 130a-e to ballonet surface 120 of ballonet 110 along their fixed orientation.

As shown in FIGS. 2A and 2B, the distance that would be measured by measurement devices 130 may change as the volume of ballonet 110 changes. For example, ballonet surface 120 may change shape and deform as the volume of ballonet 110 decreases from a full or maximum volume. In certain embodiments, ballonet tracking system 125 is configured to determine the difference between the measured distances and a set of expected distances. In some embodiments, ballonet tracking system 125 may compare the measured distances with a corresponding set of distances corresponding to ballonet 110 being full. For example, ballonet tracking system 125 may compare the measured distances with a set of distances along the measured orientations that is expected for ballonet 110 being full, e.g., ballonet surface 120 is expanded at its maximum. The predetermined set of distances may be obtained from an outside source, e.g., preloaded into a memory during the time of installation or production, or obtained and stored when measuring distances when ballonet 110 is known to be full. Based on these comparisons, ballonet tracking system 125 may calculate a set of differences, e.g., a set of deviations from a full state.

In certain embodiments, ballonet tracking system 125 is further configured to determine the present volume of ballonet 110 based on the calculated differences. The volume may be calculated in a variety of ways. For example, given a known geometry of ballonet 110 at a full state, it may be known how ballonet surface 120 deforms at various states of emptiness. Thus, ballonet tracking system 125 may be configured to compare the expected deviations with the calculated differences from the measurements from each measurement device 130. As another example, a polygonal approximation of ballonet 110 may be constructed using the calculated differences. Using the calculated differences, ballonet tracking system 125 may constructed a three-dimensional shape that approximates ballonet surface 120 in its current state. The volume of that three-dimensional shape may then, be used to calculate the volume of ballonet 110. While a few examples have been described above of how the calculated differences may be used to determine the volume of ballonet 110, any suitable algorithm or method known to persons having skill in the art for constructing the volume of ballonet 110 from the differences from the measured distances and the set of expected distances is contemplated in this disclosure.

In certain embodiments, ballonet tracking system 125 further includes at least one temperature sensor 150 and at least one pressure sensor 155. Temperature sensor 150 and pressure sensor 155 may each be configured to measure values of temperature and pressure, respectively, inside ballonet 110. This information may be used to determine the present temperature and pressure within the air contained in ballonet 110. In some embodiments, ballonet tracking system 125 is further configured to measure a mass of air within ballonet 110 based the measurements from temperature sensor 150 and pressure sensor 155, and the calculated volume of ballonet 110. For example, given a known pressure, temperature, and volume of a gas, the number of molecules, and thereby the mass, of the gas may be determined. Using a simple version, known as the ideal gas law, $PV=nRT$, where P is the pressure, V is the volume, n is the number of molecules, R is a known constant, and T is the temperature, the number of molecules n can be calculated as $n=PV/RT$. Therefore, ballonet tracking system 125 may determine n or a mass analogue thereto using the temperature and pressure from sensors 150 and 150 with the calculated volume to determine the mass within ballonet 110. More involved equations may be used depending on the level of accuracy desired or applicable in the particular application.

Additionally, ballonet tracking system 125, in certain embodiments, may also determine the center of gravity of the air within ballonet 110. For example, ballonet tracking system 125 may be configured to determine the approximate shape of ballonet 110 in its current state and using a presumed uniform distribution of air, determine the center of gravity. There may also be a number of other techniques known to persons having skill in the art to construct a center of gravity from the measurements obtained by ballonet tracking system 125. Knowing the mass and center of gravity is useful in controlling airship 100. For example, it may indicate how airship 100 would react to applied forces, such as by gusts of wind or deliberate propulsion on the outside of airship 100.

In certain embodiments, ballonet tracking system 125 is communicatively coupled to a vehicle management system 140 of airship 100. Vehicle management system 140 may control various operations onboard airship 100. For example, vehicle management system 140 may be used to control the propulsion systems of airship 100, the environmental conditions for passengers and/or cargo, the flow of air in and out of ballonets 110, etc. As described earlier, the volume of ballonets 110 may be of particular importance to controlling the movement of airship 100. In this manner, vehicle management system 140 may be coupled to ballonet tracking system 125, thereby enabling the communication of certain measurements or calculations, such as the measured distances, calculated differences in distances, or the calculated volume.

In certain embodiments, all, none, or all of the functionality of ballonet tracking system 125 is integrated with vehicle management system 140. For example, certain processing operations, such as calculating differences or volumes, may occur within vehicle management system 140 in addition to or in lieu of within ballonet tracking system 125. As another example, certain data, such as the predetermined set of distances, may be stored within vehicle management system 140 and accessed by ballonet tracking system 125 when needed. In this manner, certain functionality described with respect to ballonet tracking system 125 may be performed, in part or in whole, by components of vehicle management system 140.

In certain embodiments, ballonet tracking system 125 is configured to measure a plurality of distances from one or more fixed locations to one or more locations on ballonet surface 120 of ballonet 110 without using additional reflective material disposed at ballonet surface 120. For example, measurement devices 130a-e may be configured to emit light that reflects off of the material of ballonet surface 120 of ballonet. Additionally, adding pieces of reflective material to ballonet surface 120 of ballonet 110 may not enhance the measurement of distances from measurement devices 130a-e. For example, as ballonet surface 120 deforms with changing volume of ballonet, these pieces of reflective material may move positions with ballonet surface 120. Accordingly, systems relying on the presence of the reflective material may fail to make any distance measurement, let alone an accurate measurement. In this manner, ballonet tracking system 125 may be configured to measure the distances to ballonet surface 120 of ballonet 110 without additional reflective material disposed on ballonet surface 120.

Figure 3:
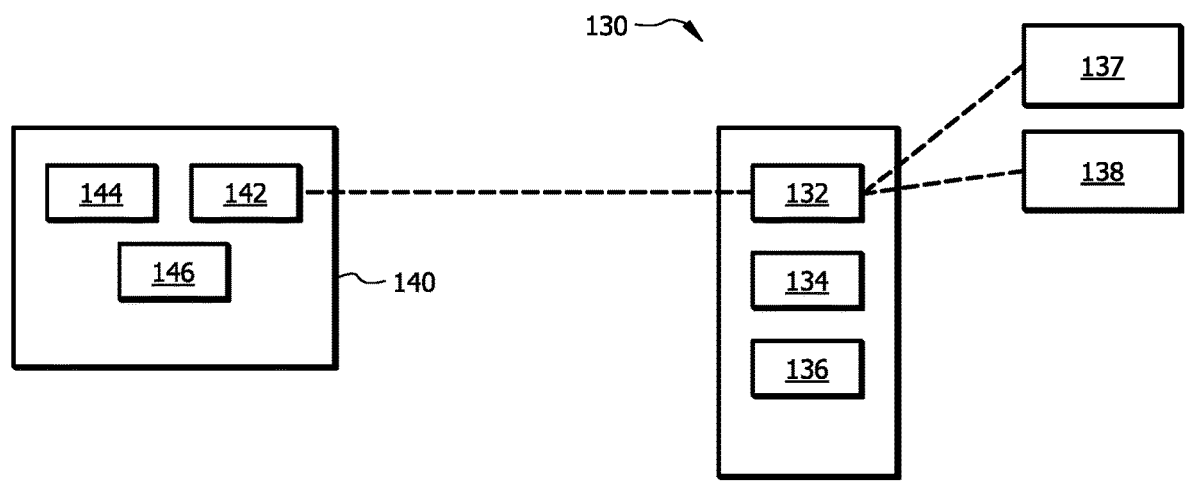
FIG. 3 illustrates a vehicle management system communicatively coupled to at least a portion of the ballonet tracking system in FIGS. 2A and 2B, according to certain embodiments.

FIG. 3 illustrates vehicle management system 140 communicatively coupled to at least a portion of the ballonet tracking system 125 in FIGS. 2A and 2B, according to certain embodiments. In certain embodiments, vehicle management system 140 is communicatively coupled to one or more measurement devices 130. For example, vehicle management system 140 may be communicatively coupled to all measurement devices 130, one measurement device 130 directly as an intermediary for other measurement devices, or measurement devices 130 indirectly through an intermediate interface (not depicted). In this manner, vehicle management system 140 and measurement devices 130 may exchange information between them to ensure proper operation of airship 100.

Vehicle management system 140 may include one or more interfaces 142, memory 144, and processing circuitry 146. Measurement device 130 may include one or more interfaces 132, memory 134, and processing circuitry 136. Information or data may be shared between vehicle management system 140 and measurement device 130 over a communications link via interfaces 142 and 132. The communications link may be line link, a wireless link, or some combination thereof.

Processing circuitry 146, 136 can be any electronic circuitry, including, but not limited to microprocessors, ASIC, ASIP, and/or state machines, that communicatively couples to one or more interfaces 142, 132, respectively, memory 144, 134, respectively. Processing circuitry 146, 136 may be 8-bit, 16-bit, 32-bit, 64-bit or of any other suitable architecture. Processing circuitry 146, 136 may include an ALU for performing arithmetic and logic operations, processor registers that supply operands to the ALU and store the results of ALU operations, and a control unit that fetches instructions from memory 144, 134, respectively, and executes them by directing the coordinated operations of the ALU, registers and other components. Processing circuitry 146, 136 may include other hardware and software that operates to control and process information. Processing circuitry 146, 136 executes software stored in memory 144, 134, respectively, to perform any of the functions of vehicle management system 140, ballonet tracking system 125, and measurement device 130, respectively, described herein. Processing circuitry 146, 136 may control the operation of vehicle management system 140 and measurement device 130, respectively, for example by calculating the volume of ballonet 110 using the calculated differences based on the measurements obtained via interface 132 and information from memory 144, 134. Processing circuitry 146, 136 may be a programmable logic device, a microcontroller, a microprocessor, any suitable processing device, or any suitable combination of the preceding. Processing circuitry 142, 132 is not limited to a single processing device and may encompass multiple processing devices.

Memory 144, 134 may be any suitable type of memory. Memory 144, 134 may store, either permanently or temporarily, data, operational software, or other information for processing circuitry 146, 136, respectively. Memory 144, 134 may include any one or a combination of volatile or non-volatile local or remote devices suitable for storing information. For example, memory 144, 134 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in Memory 144, 134, a disk, a CD, or a flash drive. In particular embodiments, the software may include an application executable by processing circuitry 146, 136 to perform one or more of the functions of vehicle management system 140, ballonet tracking system 125, and measurement device 130, respectively, as described herein.

Memory 144, 134 may store one or more instructions or data, which when processed by processing circuitry 236, 246, cause vehicle management system 140, ballonet tracking system 125, and measurement device 130, respectively, to perform any of the functions described in this disclosure. For example, memory 134 may store instructions how to correlate calculated differences in distances to calculate a volume of ballonet. As another example, memory 144 may store instructions of how to adjust the propulsion system parameters based on the volume of ballonet 110 calculated by ballonet tracking system 125.

Measurement devices 130 may be any suitable device capable of measuring a distance across air from the location of measurement device 130 to a surface of ballonet surface 120 of ballonet 110. In certain embodiments, measurement device 130 may further include a light emitter 137 and light-receiver 138. Light emitter 137 is configured to emit light along a predetermined path relative to measurement device 130. Light receiver 138 is configured to receive and/or detect light from outside measurement device 130.

Measurement device 130 is further configured to determine the distance from measurement device 130 to ballonet surface 120 of ballonet 110 along a particular orientation. For example, measurement device 130 may store a time value in memory 134 associated with the emission of light from light emitter 137. Once light is detected at light receiver 128, a second time value is stored in memory 134 associated with the receipt of a reflection of the emitted light. Processing circuitry 136 may use these stored values in memory 134 to calculate a distance based on the time values, e.g., based on the speed of light through air. In this manner, measurement device 130 may use light emitter 137 and light receiver 138 to measure distances from measurement device 130 to a position on ballonet surface 120 of ballonet 110. This process may be repeated by each measurement device 130 in ballonet tracking system 125 for each orientation to be measured. These distances may be compiled into a set of distances at a central location in ballonet tracking system 125 to allow further processing, e.g., to determine the differences in distances and volume of ballonet. Additionally, each distance measurement may be associated with a particular measurement device 130 and/or an orientation and/or position of measurement device 130, e.g., a relative polar and/or azimuthal angle. Accordingly, the measured distances may be correlated to respective values of the predetermined set of distances.

In certain embodiments, measurement device 130 is a laser range finder. For example, light emitter 137 may be a lasing device emitting a beam of light at a predetermined frequency. Light receiver 138 may be a photodetector configured to detect light in a frequency range containing the frequency at which light emitter lases. Using the timing between emission and detection of the laser light, measurement device 130 may determine an accurate amount of time it took the laser light to travel to and from ballonet surface 120 of ballonet 110. As described above, this may be translated or calculated into a distance from measurement device 130 to ballonet 110.

While the example of ballonet tracking system 125 having five measurement devices 130a-e was used to describe certain features and embodiments of this disclosure, any number of measurement devices 130 may be used to allow ballonet tracking system 125 to accurately measure the volume of ballonet 110. For example, ballonet tracking system 125 may only include a single measurement device 130. In some embodiments, the orientation of measurement devices 130 are not fixed. In this manner, the orientation of measurement devices 130 may be changed during measurement to measure additional distances to points on the surface of ballonet surface 120 of ballonet 120. While additional variations are described below in reference to FIGS. 4A-C, other variations are contemplated by this disclosure, including those having different types of measurement devices, different mounting structures to ballonet 110, different mechanisms of coupling measurement devices 130 together, or those integrated certain functionality across different portions of ballonet tracking system 125 and/or vehicle management system 140.

Figure 4A:
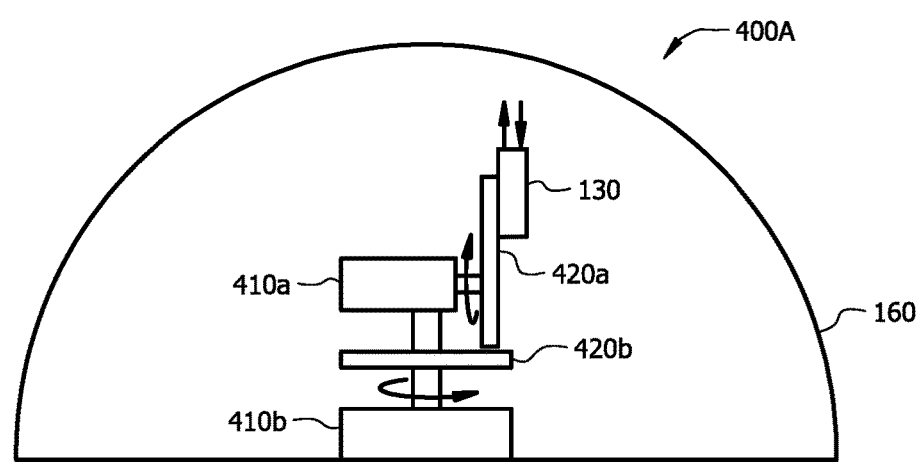
FIGS. 4A-4C illustrate three variations of ballonet tracking systems that may be used in a ballonet, according to certain embodiments.
Figure 4B:
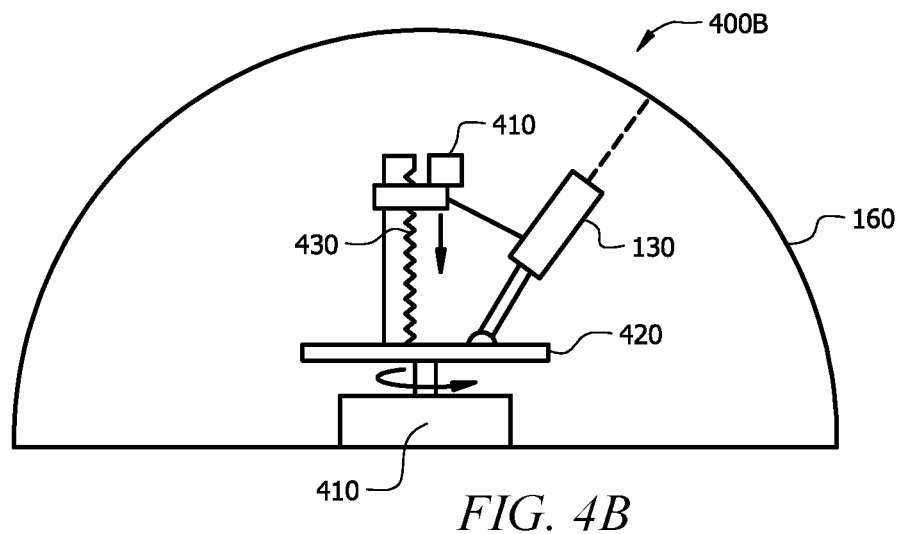
Figure 4C:
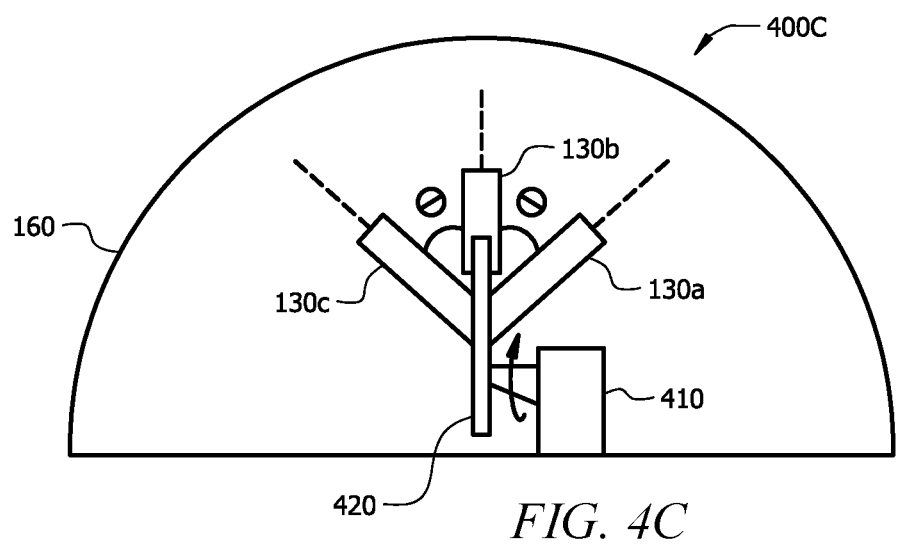

FIG. 4A-C illustrate three variations 400A-C of ballonet tracking system 125 that may be used in a ballonet, such as ballonet 110, according to certain embodiments.

FIG. 4A illustrates a first variation 400A of ballonet tracking system 125. First variation 400A includes a measurement device 130, according to the various embodiments previously described. First variation 400A may include one or more motors 410 and one or more mounts 420.

Motors 410 and mounts 420 may control the orientation of measurement device 130 relative to ballonet 110. For example, in certain embodiments, measurement device 130 may be mounted, or fastened in any suitable manner, to mount 420a. Mount 420a may be coupled to motor 410a such that as motor 410a rotates, mount 420a also rotates. Accordingly, motor 410a may control the orientation of measurement device 130. As depicted in this example, motor 410a and mount 420a may be controlled to change the polar angle of measurement device 130 relative to the fixed portion of ballonet 120.

Similarly, in certain embodiments, motor 410a is mounted to mount 420a, which is coupled to motor 410b. Because mount 420a is coupled to motor 410b, mount 420a may rotate when motor 410b rotates. Accordingly, this may cause motor 410a to rotate, thereby causing a further rotation of mount 420a and measurement device 130. In some embodiments, the rotational axis of motor 410b and motor 410a are orthogonal or at a 90-degree relative angle to each other. For example, in the depicted example, motor 410b and mount 420b may be controlled to change the azimuthal angle of measurement device relative to the fixed portion of ballonet. Accordingly, motors 410a-b and mounts 420a-b may be controlled to vary the azimuthal and polar angles of the orientation of measurement device 130. In this manner, first variation 400A may vary the orientation of measurement device 130 over a range of angles.

In certain embodiments, first variation 400A is configured to vary the orientation of measurement device 130 over 360 degrees around the azimuthal angle and at least 180 degrees over the polar angle. For example, if ballonet 110 has a shape of approximately a half-sphere, then first variation 400A may controlled to orient measurement device 130 towards the entire surface of ballonet surface 120 of ballonet. In certain embodiments, first variation 400A is configured to vary the orientation of measurement device 130 over 360 degrees around the azimuthal angle and less than 180 degrees over the polar angle. For example, it may not be necessary to orient measurement device 130 across that entire range of angles, e.g., due to the shape of ballonet 110 or the measurement requirements to calculate a volume of ballonet 110.

In certain embodiments, the ranges over the azimuthal and polar angles may be varied based on application and/or location of first variation 400A within ballonet 400a. For example, if multiple first variations 400A are disposed within ballonet 110, then it the range of angles may be limited based on the different coverage areas of each of first variations 400A. Similarly, the shape of ballonet 110 may also factor over which angles first variation 400A is configured to orient measurement device 130.

First variation 400A may measure a plurality of distances from first variation 400A and one or more locations on ballonet surface 120 of ballonet 110. For example, measurement device 130 may emit a light signal from first variation 400A and receive a reflection of the light signal from ballonet surface 120 of ballonet 110. First variation 400A may then change the orientation of measurement device 130, e.g., by controlling motor 410a and/or 410b to rotate certain amounts. Measurement device 130 may repeat the process of emitting light signals and receiving the reflections for a number of orientations along ballonet surface 120 of ballonet 110. Accordingly, first variation 400A may measure a plurality of distances from one or more fixed locations and a plurality of locations on ballonet surface 120 of ballonet 110.

As described above with respect to ballonet tracking system 125, first variation 400A may use those measured distances to calculate differences between a predetermined set of expected distances and the plurality of measured distances. Based on the calculated differences, first variation 400A may then calculate volume of the ballonet. Thus, first variation 400A may provide an accurate volume of ballonet 110, which may be used to control airship 100.

In certain embodiments, first variation 400A includes housing 160 disposed over motors 410a-b, mounts 420a-b, and measurement device 130. Housing 160 may protect sensitive components of first variation 400A from inadvertent contact, impact from air currents within ballonet 110, and/or dust or particulates. In some embodiments housing 160 may be transparent at least at certain portions of housing 160. For example, housing 160 may be completely transparent to the light emitted from measurement device 130, thereby ensuring that the measurements of the distances to ballonet surface 120 of ballonet 110 are still accurate. Any suitable material may be used to provide housing 160, including plastics, glass, etc.

FIG. 4B illustrates a second variation 400B of ballonet tracking system 125. Second variation 400B is similar to first variation 400A in that second variation includes motor 410b and mount 420 which are controllable to change the azimuthal orientation of measurement device 130.

Second variation 400B differs from first variation 400A at least due to the exclusion of a second mount that rotates in an orthogonal direction to mount 420. In contrast, second variation 400B includes a motor 410a coupled to rack and pinion 430. Measurement device 130 is connected to rack and pinion 430 by link 440. Link 440 may be any suitable coupling, such as a steel string or a hinged rod, that connects a portion of rack and pinion 430 to measurement device. Measurement device 130 may be mounted to mount 420 via hinge 445 at the surface of mount 420.

In certain embodiments, motor 410a rotates, causing the portion of rack and pinion 430 coupled to measurement device 130 via link 440 to move vertically. As the portion of rack and pinion 430 changes its vertical position, the polar orientation of measurement device 130 may change. For example, if the portion of rack and pinion 430 is displaced downward toward mount 420, measurement device 130 may rotate about hinge 445 to have a lower polar-angle orientation relative to rack and pinion 430. Accordingly, motor 410a may be controllable to change the polar orientation of measurement device 130.

In certain embodiments, the combination of motors 410a and 410b can be controllable to change the orientation of measurement device 130 over a range of polar and azimuthal angles. In some embodiments, the polar angle may vary from zero to 90 degrees and the azimuthal angle may vary from 0 to 360 degrees. In some embodiments, the polar and azimuthal angles may vary less or more than 90 and 360 degrees, respectively. Similarly, the range of angles over which measurement device 130 is oriented may be based on the application and/or position of second variation 400B within ballonet 110.

Accordingly, second variation 400B may be used to provide distance measurements across a range of orientations, thereby representing a range of points along ballonet surface 120 of ballonet 110. As a result, an accurate volume may be calculated for ballonet 110.

In certain embodiments, second variation 400B includes housing 160 disposed over motors 410a-b, mount 420, rack and pinion 430, and measurement device 130. Housing 160 may protect sensitive components of second variation 400B from inadvertent contact, impact from air currents within ballonet 110, and/or dust or particulates. In some embodiments housing 160 may be transparent at least at certain portions of housing 160. For example, housing 160 may be completely transparent to the light emitted from measurement device 130, thereby ensuring that the measurements of the distances to ballonet surface 120 of ballonet 110 are still accurate. Any suitable material may be used to provide housing 160, including plastics, glass, etc.

FIG. 4C illustrates a third variation 400C of ballonet tracking system 125. In contrast to first variation 400A and second variation 400B, third variation 400C only includes a single motor 410 that rotates about a single axis. In certain embodiments, motor 410 is oriented to rotate across polar angles, such as motor 410a of FIG. 4A. In certain embodiments, motor 410 is oriented to rotated across azimuthal angles, such as motor 410b of FIG. 4A and motor 410b of FIG. 4B.

Instead of including a second degree of movement, third variation 400C includes multiple measurement devices 130a-c mounted to the same mount 420 that rotates with motor 410. Each of measurement devices 130a-c is offset by a fixed angle from an adjacent one of measurement devices 130a-c. As depicted in the illustrated example in FIG. 4C, measurement device 130a is offset by a fixed angle from measurement device 130b and measurement device 130c is offset by a fixed angle from measurement device 130b. These offset angles may be the same or different. In some embodiments, the offset angles are the same and measurement device is oriented having a polar angle of zero relative to the portion of ballonet 110 that does not change shape. For example, in a starting position, measurement device 130b may be oriented directly up (assuming a zero pitch of aircraft 100) and each of measurement devices 130a and 130c oriented a fixed angle offset from the vertical.

In certain embodiments, the offset angles are along an axis orthogonal or different from the rotational axis of motor 410. For example, if motor 410 rotates mount 420 along the polar angles at a fixed azimuthal angle, then the offset angles may be along the polar axis at a fixed azimuthal angle rotated 90 degrees relative to the fixed azimuthal angle of mount 420's rotation. Accordingly, this creates a spread of the orientations of measurement devices 130a-c that allows for the measurement of distances to a variety of locations on ballonet surface 120 of ballonet 110 at different azimuthal and polar angles.

Third variation 400C may measure a plurality of distances from third variation 400C and one or more locations on ballonet surface 120 of ballonet 110. For example, each of measurement devices 130a-c may emit a light signal from third variation 400C and receive a reflection of the light signal from ballonet surface 120 of ballonet 110. Third variation 400C may then change the orientation of measurement devices 130a-c, e.g., by controlling motor 410 to rotate certain amounts. Measurement devices 130a-c may repeat the process of emitting light signals and receiving the reflections for a number of orientations along ballonet surface 120 of ballonet. Accordingly, third variation 400C may measure a plurality of distances from one or more fixed locations and a plurality of locations on ballonet surface 120 of ballonet 110.

As described above with respect to ballonet tracking system 125, third variation 400C may use those measured distances to calculate differences between a predetermined set of expected distances and the plurality of measured distances. Based on the calculated differences, third variation 400C may then calculate volume of the ballonet. Thus, third variation 400A may provide an accurate volume of ballonet 110, which may be used to control airship 100.

In certain embodiments, third variation 400C includes housing 160 disposed over motor 410, mount 420, and measurement devices 130a-c. Housing 160 may protect sensitive components of third variation 400C from inadvertent contact, impact from air currents within ballonet 110, and/or dust or particulates. In some embodiments housing 160 may be transparent at least at certain portions of housing 160. For example, housing 160 may be completely transparent to the light emitted from measurement device 130, thereby ensuring that the measurements of the distances to ballonet surface 120 of ballonet 110 are still accurate. Any suitable material may be used to provide housing 160, including plastics, glass, etc.

Similar to ballonet tracking system 125 in FIGS. 2A and 2B, in certain embodiments, variations 400A-C may be communicatively coupled to vehicle management system 140. In this manner, the measurements performed by variations 400A-C may be used by vehicle management system 140 to control airship 140.

In certain embodiments, each of variations 400A-C is disposed at only one location on ballonet surface 120 of ballonet 110. For example, instead of the five locations shown in example ballonet tracking system 125 depicted in FIGS. 2A and 2B, variation 400a may be located at only on location, such as the center of the fixed portion of ballonet surface 120, e.g., where measurement device 130e is located in ballonet 110 of FIGS. 2A and 2B. In this manner, the arrangement of measurement devices 130 may be simplified. Further, as discussed above, because the orientation of measurement devices 130 are not fixed in variations 400A-C, multiple distance may be measured from the single fixed location.

Figure 5:
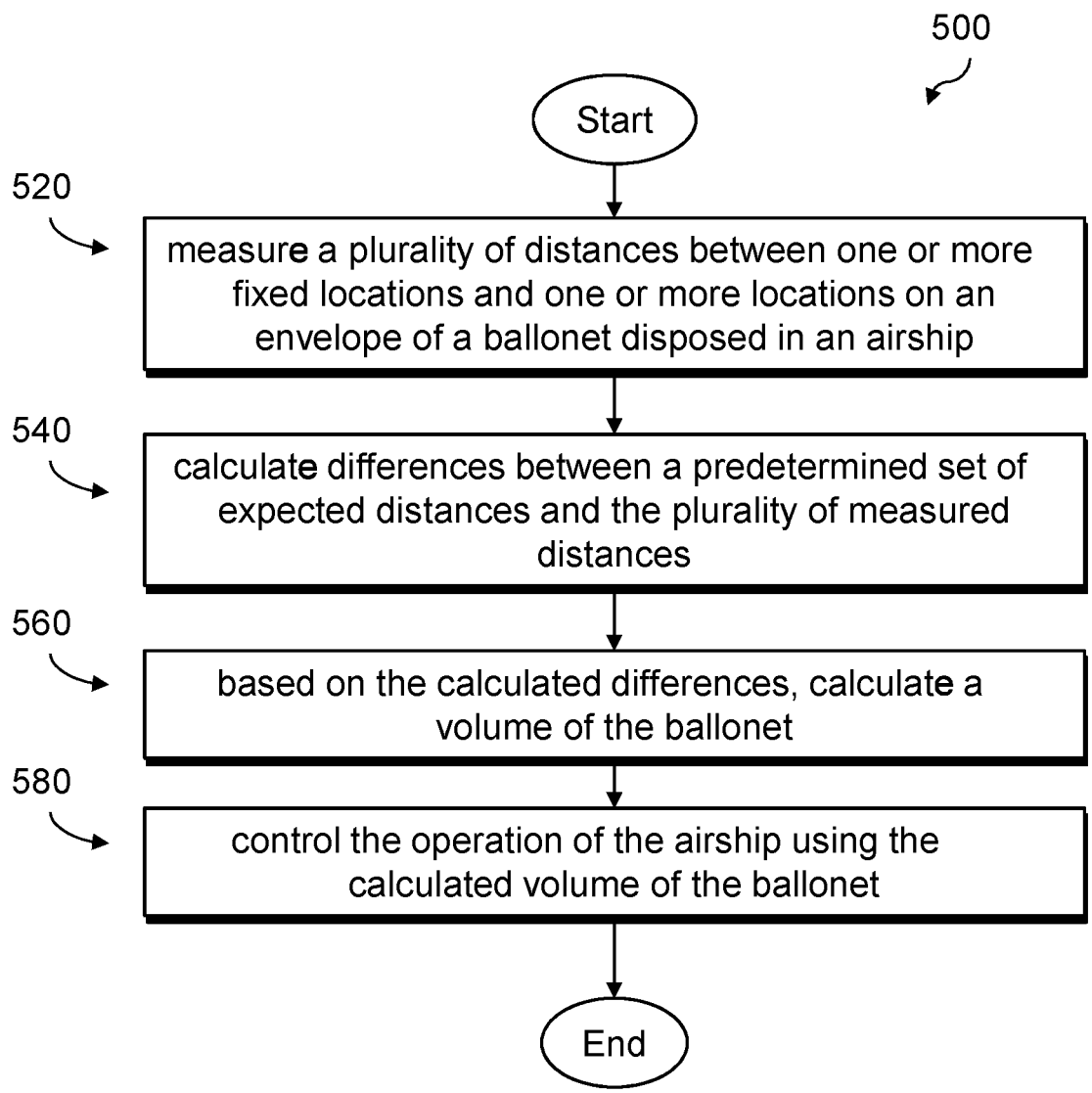
FIG. 5 is a flow chart diagram illustrating an example method of calculating the volume of a ballonet in an airship, according to certain embodiments.

FIG. 5 is a flow chart diagram illustrating an example method 500 of calculating the volume of a ballonet in an airship, according to certain embodiments. Method 500 may begin at step 520, wherein a plurality of distances between one or more fixed locations and one or more locations on a ballonet surface of a ballonet disposed in an airship are measured. For example, one or more distances may be measured from a plurality of locations fixed to a portion of the ballonet to various points on the ballonet surface of the ballonet, which are subject to deformation or change of position as the volume within the ballonet changes. As another example, one or more distances may be measured from a single location inside the ballonet in a plurality of directions towards the ballonet surface of the ballonet. As yet another example, ballonet measurement system 125 may use measurement devices 130 to emit and receive reflected light to determine the one or more distances.

At step 540, differences between a predetermined set of expected distances and the plurality of measured distances may be calculated. For example, the measured values may be subtracted from the expected values for a ballonet that is full, e.g., at its highest volume. In some embodiments, this step may include correlating the measured distances with one or a set of distances the predetermined set of expected distances. For example, the correlation may be based on the location and/or orientation of the measurement devices used to obtain the distances. In this manner, the appropriate distances may be compared and used to calculate the differences.

At step 560, a volume of the ballonet is calculated based on the calculated differences. For example, the calculated differences may be further processed to calculated amount of reduction of volume of the ballonet, as compared to the ballonet's full volume. As another example, the calculated differences may be used to determine an approximate three-dimensional shape that corresponds to the approximate shape of the ballonet in its current state. That three-dimensional shape may be used to then calculate the current volume of the ballonet. In certain embodiments, one or more components of ballonet tracking system 125 may be used to carry out this step, such as one or more measurement devices 130.

After the volume is obtained, at step 580, the operation of the airship may be controlled using the calculated volume of the ballonet. For example, based on the volume of the ballonet, the flow of air into or out of the ballonet may be controlled. This may control the lift and/or pitch or roll of the airship. As another example, the calculated volume of the ballonet may be used as an intermediary parameter to determine the mass and center of gravity of the air within ballonet, e.g., using measured pressure and temperature values within the ballonet. Using this information, the control of airship may be enhanced by adjusting how the propulsion systems react to commands, e.g., from an operator, to ensure a stable flight.

Accordingly, method 500 provides better operation of an airship, such as airship 100, by obtaining an accurate volume of the ballonet. In some embodiments, method 500 may be carried out, independently, concurrently, or sequentially, for each ballonet of the airship. The values of volume for each ballonet may be combined for use in controlling the operation of the airship.

Modifications, additions, or omissions may be made to method 500 depicted in FIG. 5. Any steps may be performed in parallel or in any suitable order. Furthermore, method 500 may include more, fewer, or other steps. Additionally, one or more of the steps of method 500, or embodiments thereof, may be performed by any suitable component or combination of components of ballonet tracking system 125, variations 400A-C, and/or vehicle management system 140.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An airship, comprising:
   a ballonet disposed within the airship, wherein the ballonet comprises a ballonet surface;
   a ballonet tracking system disposed at a fixed location within the ballonet, the ballonet tracking system comprising:
      a measurement device comprising a light emitter and a light detector;
      a first mount coupled to a first motor, the first mount and the first motor configured to change a polar angle of the measurement device relative to the fixed location; and
      a second mount coupled to a second motor, the second mount and the second motor configured to change an azimuthal angle of the measurement device relative to the fixed location;
      wherein the ballonet tracking system is configured to:
         measure a plurality of distances between the fixed location and one or more locations on the ballonet surface;
         calculate differences between a predetermined set of expected distances and the plurality of measured distances; and
         based on the calculated differences, calculate a volume of the ballonet; and
   a vehicle management system communicatively coupled to the ballonet tracking system, wherein the vehicle management system is configured to control the operation of the airship using the calculated volume of the ballonet.

2. The airship of claim 1, further comprising:
   a pressure sensor configured to measure a pressure within the ballonet; and
   a temperature sensor configured to measure a temperature within the ballonet;
   wherein the ballonet tracking system is further configured to measure a center of gravity and a mass of air based on the measured pressure, the measured temperature, and the calculated volume of the ballonet.

3. The airship of claim 1, the ballonet tracking system further comprising a transparent housing covering the measurement device, the first and second motors, and the first and second mounts.

4. A system disposed at a fixed location within a ballonet of an airship, the system comprising:
   a measurement device comprising a light emitter and a light detector;
   a first mount coupled to a first motor, the first mount and the first motor configured to change a polar angle of the measurement device relative to the fixed location; and
   a second mount coupled to a second motor, the second mount and the second motor configured to change an azimuthal angle of the measurement device relative to the fixed location;
   wherein the system is configured to:
      measure a plurality of distances between the fixed location and one or more locations on a surface of the ballonet;
      calculate differences between a predetermined set of expected distances and the plurality of measured distances; and
      based on the calculated differences, calculate a volume of the ballonet; and
   wherein the airship is operated at least based on the calculated volume of the ballonet.

5. The system of claim 4, wherein the predetermined set of expected distances comprise distances from the fixed location and predetermined locations on the ballonet surface when the ballonet is full.

6. The system of claim 4, wherein the system configured to measure each of the plurality of distances comprises:
   emitting light from the light emitter from the fixed location; and
   measuring a reflection at the light detector of the emitted light reflected from the ballonet surface;
   wherein the respective measured distance is based on the measured reflection.

7. The system of claim 4, wherein the fixed location is located on a portion of the ballonet that does not change shape based on a volume of air within the ballonet.

8. The system of claim 4,
   wherein the system configured to measure the plurality of distances comprises:
   changing the polar or azimuthal angle of the light emitter.

9. The system of claim 4, further comprising:
   one or more pressure sensors configured to measure a pressure within the ballonet; and
   one or more temperature sensors configured to measure a temperature within the ballonet;
   wherein the system is further configured to measure a mass of air within the ballonet based on the measured pressure, the measured temperature, and the calculated volume of the ballonet.

10. The system of claim 4, wherein:
    the system is communicatively coupled to a vehicle management system of the airship; and
    the vehicle management system modifies the volume of air within the ballonet based on a communication from the system to the vehicle management system, wherein the communication comprises the calculated volume of the ballonet.

11. A method, comprising:
    measuring, using a ballonet tracking system disposed at a fixed location within the ballonet of an airship, a plurality of distances between the fixed location and one or more locations on a surface of the ballonet, wherein the ballonet tracking system comprises:
       a measurement device comprising a light emitter and a light detector;
       a first mount coupled to a first motor, the first mount and the first motor configured to change a polar angle of the measurement device relative to the fixed location; and
       a second mount coupled to a second motor, the second mount and the second motor configured to change an azimuthal angle of the measurement device relative to the fixed location;
    calculating differences between a predetermined set of expected distances and the plurality of measured distances;
    based on the calculated differences, calculating a volume of the ballonet; and
    controlling the operation of the airship using the calculated volume of the ballonet.

12. The method of claim 11, wherein the predetermined set of expected distances comprise distances from the fixed location and predetermined locations on the ballonet surface when the ballonet is full.

13. The method of claim 11, further comprising determining the predetermined set of expected distances by measuring a plurality of distances between the fixed location and the one or more locations on the ballonet surface when the ballonet is full.

14. The method of claim 11, further comprising determining the mass and center of gravity of air within the ballonet based on the calculated volume of the ballonet.

15. The method of claim 11, wherein controlling the operation of the airship comprises changing the volume of air within the ballonet.

16. The method of claim 11, wherein measuring each of the plurality of distances comprises:
    emitting light from the fixed location; and
    measuring a reflection of the emitted light from the ballonet surface;
    wherein the respective measured distance is based on the measured reflection.

17. The method of claim 16, wherein:
    emitting light comprises turning on a laser device at the fixed location for a fixed duration; and
    measuring the reflection of the emitted light comprises using a photodetector and processing circuitry to determine a duration of the measured reflection.

18. The method of claim 11, wherein measuring a plurality of distances comprises:
    measuring a first distance from the fixed location to a first location on the surface of the ballonet using the light-emitter and the light-detector;
    changing the orientation of the light-emitter and light-detector relative to the ballonet; and
    measuring a second distance from the fixed location to a second location on the surface of the ballonet using the light-emitter and light-detector.

19. The method of claim 18, further comprising, for each of the plurality of distances:
    changing the orientation of the light-emitter and light-detector relative to the ballonet; and
    measuring a next distance from the fixed location to a different location on the surface of the ballonet using the light-emitter and light-detector.

* * * * *